(12) United States Patent
Hu et al.

(10) Patent No.: US 9,118,446 B2
(45) Date of Patent: Aug. 25, 2015

(54) METHODS AND USER EQUIPMENT IN A WIRELESS COMMUNICATION NETWORK

(71) Applicant: Huawei Technologies Co., Ltd., Shenzhen, Guangdong (CN)

(72) Inventors: Sha Hu, Lund (SE); Fredrik Rusek, Lund (SE); Gengshi Wu, Lund (SE); Shashi Kant, Lund (SE); Basuki Endah Priyanto, Lund (SE); Jianjun Chen, Lund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 14/031,805

(22) Filed: Sep. 19, 2013

(65) Prior Publication Data

US 2015/0078490 A1    Mar. 19, 2015

(51) Int. Cl.
*H04L 1/00* (2006.01)
*H04W 24/02* (2009.01)
*H04B 7/04* (2006.01)

(52) U.S. Cl.
CPC ............ *H04L 1/0054* (2013.01); *H04B 7/0413* (2013.01); *H04W 24/02* (2013.01)

(58) Field of Classification Search
CPC .. H04B 7/0413; H04B 7/0837; H04B 7/0854; H04B 7/0857; H04B 7/0882; H04B 7/0885; H04B 17/005; H04B 17/0055; H04B 17/0057; H04B 17/006; H04J 11/004; H04J 11/0046; H04L 25/024; H04L 25/0242; H04L 25/025; H04L 25/0254; H04L 25/0256; H04L 25/0328; H04L 25/03292; H04L 25/03299; H04L 25/03305; H04L 25/03331; H04L 25/03891; H04L 25/0391; H04L 2201/02; H04L 2201/06; H04L 1/0054; H04W 24/02

USPC ......... 375/224, 225, 227, 259, 260, 262, 267, 375/340, 341, 346; 714/794, 795
See application file for complete search history.

(56) References Cited

U.S. PATENT DOCUMENTS

| | | | | |
|---|---|---|---|---|
| 7,672,408 | B2 * | 3/2010 | Higuchi et al. | 375/347 |
| 7,869,536 | B2 * | 1/2011 | Li et al. | 375/267 |

(Continued)

FOREIGN PATENT DOCUMENTS

WO    WO 2005081443 A1    9/2005

OTHER PUBLICATIONS

Zhu et al., "Layered Space-Time Equalization for Wireless MIMO Systems," *IEEE Transactions on Wireless Communications*, vol. 2, No. 6, pp. 1189-1203, IEEE, New York, New York (Nov. 2003).

(Continued)

*Primary Examiner* — Young T Tse
(74) *Attorney, Agent, or Firm* — Leydig, Voit & Mayer, Ltd.

(57) ABSTRACT

A user equipment (UE) and a method are presented. The UE comprises a receiver unit and a processing circuit, and is configured for receiving wireless signals. The processing circuit is arranged for performing pre-detection of the received signals providing an initial estimation of transmitted signals. The processing circuit is also arranged for splitting the transmitted signal into disjoint subgroups, each one covering a subgroup of all layers used for the transmitted signal such that the subgroups together cover all the layers. The processing circuit is also arranged for interference cancellation performed on the subgroups of transmitted signals based on the initial estimation of the transmitted signals. The processing circuit is also arranged for detection of the subgroups of transmitted signals by utilization of an MLD algorithm, wherein the subgroup of layers within each one of the subgroups of transmitted signals is detected simultaneously.

17 Claims, 8 Drawing Sheets

(56) References Cited

U.S. PATENT DOCUMENTS

| | | |
|---|---|---|
| 8,411,806 B1 | 4/2013 | Lee et al. |
| 2011/0239080 A1* | 9/2011 | Sakaue et al. ............ 714/752 |

OTHER PUBLICATIONS

Cirkic, Mirsad and Erik G. Larsson, "SUMIS: A Near-Optimal Soft-Output MIMO Detector at Low and Fixed Complexity," Department of Electrical Engineering (ISY), Linkoping University, Sweden (Sep. 26, 2013).

Moon et al., "Enhanced Groupwise Detection with a New Receive Combiner for Spatial Multiplexing MIMO Systems," *IEEE Transactions on Communications*, vol. 58, No. 9, IEEE, New York, New York (Sep. 2010).

"3GPP TS 36.101—$3^{rd}$ Generation Partnership Project; Technical Specification Group Radio Access Network; Evolved Universal Terrestrial Radio Access (E-UTRA); User Equipment (UE) radio transmission and reception (Release 11)," Version 11.0.0, $3^{rd}$ Generation Partnership Project, Valbonne, France (Mar. 2012).

\* cited by examiner

METHODS AND USER EQUIPMENT IN A WIRELESS COMMUNICATION NETWORK

FIELD OF INVENTION

Implementations described herein relate generally to a user equipment and a method in a user equipment. In particular is herein described a mechanism for detection of wireless signals in antenna streams in a multiple antenna environment.

BACKGROUND OF INVENTION

A User Equipment (UE), also known as a mobile station, wireless terminal and or mobile terminal is enabled to communicate wirelessly in a wireless communication network, sometimes also referred to as a cellular radio system. The communication may be made, e.g., between UEs, between a UE and a wire connected telephone and or between a UE and a server via a Radio Access Network (RAN) and possibly one or more core networks.

The wireless communication may comprise various communication services such as voice, messaging, packet data, video, broadcast, etc.

The UE may further be referred to as mobile telephone, cellular telephone, computer tablet or laptop with wireless capability, etc. The UE in the present context may be, for example, portable, pocket-storable, hand-held, computer comprised, or vehicle-mounted mobile devices, enabled to communicate voice and or data, via the radio access network, with another entity, such as another UE or a server.

The wireless communication network covers a geographical area which can be divided into cell areas, with each cell area being served by a radio network node, or base station, e.g., a Radio Base Station (RBS), which in some networks may be referred to as "eNB", "eNodeB", "NodeB" or "B node", depending on the technology and or terminology used.

Sometimes, the expression "cell" may be used for denoting the radio network node itself. However, the cell may also in normal terminology be used for the geographical area where radio coverage is provided by the radio network node at a base station site. One radio network node, situated on the base station site, may serve one or several cells. The radio network nodes may communicate over the air interface operating on radio frequencies with any UE within range of the respective radio network node.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications.

In 3rd Generation Partnership Project (3GPP) Long Term Evolution (LTE), radio network nodes, which may be referred to as eNodeBs or eNBs, may be connected to a gateway, e.g., a radio access gateway, to one or more core networks.

In the present context, the expressions downlink, downstream link or forward link may be used for the transmission path from the radio network node to the UE. The expression uplink, upstream link or reverse link may be used for the transmission path in the opposite direction, i.e., from the UE to the radio network node.

Beyond 3G mobile communication systems, such as e.g., 3GPP LTE, offer high data rate in the downlink by employing multiple antenna systems utilizing Multiple-Input and Multiple-Output (MIMO).

Large MIMO systems, also denoted high level MIMO systems or massive MIMO systems, are developed from the MIMO systems and use large antenna arrays to improve throughput of wireless communication systems.

Generally, in order to achieve a good performance, a relatively complex receiver design, such as a maximum-likelihood detector (MLD), is needed. There have been a number of attempts to reduce the complexity of the MLD, whereby a number of variants of near-MLD algorithms have been proposed, such as for example soft output sphere decoding (SOSD), QR-decomposition with M algorithm (QRD-M), K-Best algorithms etc. These near-MLDs are often capable of reducing the complexity in some respect. However, the lower complexities of these near-MLDs usually come at the price of scarifying the performance. Thus, in order to obtain a promising performance close to the MLD performance, the complexities of these conventional variants will also be close to the complexity of the MLD.

In order to achieve a high spectral efficiency in the LTE downlink, UE categories 5 to 8 will support 4×4 MIMO transmission and 8×8 MIMO transmission, as has been defined by the 3GPP standardization documents. The DL peak rate can be up to approximately 300 Mbps for UE category 4, and 3Gbps for UE category 8.

MLD works well for relatively small MIMO layer numbers, such as 2×2 MIMO or 3×3 MIMO. However, as the complexity of MLD increases exponentially with the number of MIMO layers and with the modulation type, it is prohibitive for a UE to utilize MLD for large number of MIMO layers, such as for 4×4 MIMO transmission and 8×8 MIMO transmission. For instance, for UEs that support 8×8 MIMO and use 64 Quadrature Amplitude Modulation (QAM) for all 8 layers, the MLD algorithm has to search through all $64^8$ possible transmitted symbol combinations. Such an extensive search procedure of course results in an enormous and disadvantageous complexity for the MLD.

There are also other types of detectors available, such as the Linear Minimal Mean Square Error (LMMSE) receiver. The LMMSE receiver has a very low computational complexity that only increases polynomially with the number of MIMO layers. This polynomial complexity increase can be compared with MLD, which increases the complexity exponentially with the number of MIMO layers. However, as is widely-known in the field, the performance of the LMSSE receiver is sub-optimal compared with MLD, especially when the channel is highly spatially correlated.

Usually, parallel interference cancellation (PIC) or serial interference cancellation (SIC) techniques are used in the LMSSE receivers to improve the LMMSE performance. LMMSE receivers utilizing PIC or SIC can utilize the Log-Likelihood Ratio (LLR) feedbacks. In this document, the notation Log-Likelihood Ratio (LLR) is used for outputs from an outer Error Correction Code (ECC) decoder, or for outputs being iterated by the LLMSE and/or MLD detectors thereby excluding the outer ECC decoder. The self-iterated LMMSE with PIC or SIC has low complexity and less process latency than the LMMSE scheme involving the outer ECC decoder. However, the self-iterated LMMSE often suffers from big and unacceptable performance losses.

The complexity problems for the MLDs and the low performance of LMMSE receivers bring major challenges for category 5~8 LTE UE detectors, which should keep the complexity low while maintaining a good performance under different channel conditions, modulation types and coding rates. In addition, with Channel Quality Indicator (CQI) feedback being utilized, the number of transmitted MIMO layers from the radio network node may vary over time, such that a first number of layers are used at a first point in time and a second number of layers are used at a second point in time. Therefore, the compatibility for the UEs to be able to support differing numbers of transmitted MIMO layers is an important aspect regarding size and/or production costs for the UE. Conventional detector solutions that do not support differing layer numbers adaptively thus had to be equipped with multiple detectors, e.g. one separate detector for each number of layers, to be able to provide compatibility to varying use of layer numbers. This adds to the UE size since it adds to the actual die size and the cost of the processor and or memory chipset.

Thus, conventional detectors suffer from high complexity and/or poor performance. This is explained more in detail below, with reference to a signal model used.

SUMMARY OF INVENTION

Embodiments of the invention solve at least some of the above mentioned disadvantages and to improve the overall performance in a wireless communication network.

A first aspect includes a method in a user equipment arranged for receiving wireless Multiple Input Multiple Output (MIMO) transmissions from a radio network node in a wireless communication system. The method is characterized by reception of MIMO signals $\hat{Y}$ from said radio network node; pre-detection of said received signals $\hat{Y}$, said pre-detection providing an initial estimation of transmitted signals $\hat{S}$ corresponding to the received signals $\hat{Y}$; splitting (203) the transmitted signal $\hat{S}$ into a number G of disjoint subgroups $X_g$ of transmitted signals, wherein each one of said number G of subgroups $X_g$ of transmitted signals covers a subgroup $n_g$ of all layers 2L used for said transmitted signals $\hat{S}$; $0 \leq g < G$ and $1 \leq G \leq L$; such that said number G of subgroups $X_g$ of transmitted signals together cover all said layers 2L; interference cancellation performed on said number G of subgroups $X_g$ of transmitted signals based on said initial estimation of said transmitted signals $\hat{S}$; and detection of said number G of subgroups $X_g$ of transmitted signals by utilization of a Maximum Likelihood Detection (MLD) algorithm, wherein said subgroup $n_g$ of layers within each one of said number G of subgroups $X_g$ of transmitted signals are detected simultaneously.

According to an embodiment of the method, said splitting of the transmitted signal $\hat{S}$ into said number G of subgroups $X_g$ of transmitted signals includes choosing a splitting pattern based on an evaluation of Achievable Information data Rates $AIR_g$ for each one of a number G of subgroups $T_g$ of an effective channel matrix $\hat{H}$ being split according to said splitting pattern. According to an embodiment of the method, said evaluation includes identifying a permutation $\hat{P}$ corresponding to a maximum for a sum of said achievable information data rates AIR; and sorting said identified permutation $\hat{P}$ such that elements $\{C_0, C_1, \ldots, C_{G-1}\}$ corresponding to said permutation $\hat{P}$ are arranged in ascending value order $\{C'_0, C'_1, \ldots, C'_{G-1}\}$; $C'_m < C'_n$ when $0 \leq m < n < G$.

According to an embodiment of the method, a set $\Omega$ of all preferable permutations is constructed as including permutations $\hat{P}$ corresponding to a splitting which fulfils all of the conditions in the group of:

if a real part a first element of an original complex transmitted signal $s(i)$ is in a same subgroup $X_g$ as a real part of a second element of said original complex transmitted signal $s(j)$; $(i \neq j, 0 \leq i, j < L)$; then an imaginary part of said first element of said original complex transmitted signal $s(i)$ shall be in a same subgroup $X_g$ as an imaginary part of said second element of said original complex transmitted signal $s(j)$; and vice visa;

if a real part of a first element of an original complex transmitted signal $s(i)$ is in a same subgroup $X_g$ as an imaginary part of a second element of an original complex transmitted signal $s(j)$; $(i \neq j, 0 \leq i, j < L)$; then an imaginary part of said first element of said original complex transmitted signal $s(i)$ shall be in a same subgroup $X_g$ as a real part of said second element of said original complex transmitted signal $s(j)$; and vice visa; and a real part and an imaginary part of an element of an original complex transmitted signal $s(i)$; $(0 \leq i < L)$, shall be in different subgroups.

According to an embodiment of the method, all preferable permutations of said set $\Omega$ are pre-calculated and stored in a memory. According to an embodiment of the method, said interference cancellation includes utilizing soft information $\tilde{X}_g$ corresponding to each one of said subgroups $X_g$, respectively, said soft information $\tilde{X}_g$ being determined at said initial estimation of transmitted signals $\hat{S}$.

According to an embodiment of the method said interference cancellation includes removing, for each subgroup $X_g$, interference from other subgroups; determining a whitening matrix $W_g$ related to said each subgroup $X_g$; multiplying an effective channel matrix $T_g$ corresponding to each subgroup $X_g$ with said whitening matrix $W_g$; and performing a QR-decomposition of said multiplied effective channel matrix $T_g$ and whitening matrix $W_g$, respectively.

According to an embodiment of the method said detection of transmitted signals utilizing MLD is performed on each one of said number G of subgroups $X_g$ after said decomposition. According to an embodiment of the method, soft information $\tilde{X}_g$ for each one of said number G of subgroups $X_g$ is determined at said detection and is utilized for interference cancellation for a subsequently detected subgroup $X_{g+1}$.

According to an embodiment of the method, a Log-Likelihood Ratio combination is performed based on pre-detection Likelihood Ratio information $LLR\_Pre(X_g)$ for each one of said number G of subgroups $X_g$ and on detection Likelihood Ratio information $LLR\_Post(X_g)$ for each one of said number G of subgroups $X_g$. According to an embodiment of the method, said pre-detection Log-Likelihood Ratio information $LLR\_Pre(X_g)$ is determined based on said pre-detection. According to an embodiment of the method, said detection Log-Likelihood Ratio information $LLR\_Post(X_g)$ is determined based on said detection utilizing MLD. According to an embodiment of the method, said Log-Likelihood Ratio information $LLR\_Post(X_g)$ for said number G of subgroups $X_g$ is applied with a de-permutation before said Log-Likelihood Ratio combination is performed, said de-permutation being an inverse of a permutation $\hat{P}$ being utilized for said splitting of said transmitted signal $\hat{S}$ into a number G of subgroups $X_g$.

According to an embodiment of the method said Log-Likelihood Ratio combination is adaptively adjustable based on parameters related to at least one in the group of existing channel conditions for said effective channel matrix $\hat{H}$; signal to noise ratio (SNR) for said MIMO transmission; a coding rate used for said MIMO transmission; and a modulation type used for said MIMO transmission.

A second aspect includes a user equipment arranged for receiving wireless Multiple Input Multiple Output transmissions from a radio network node in a wireless communication system; said user equipment being characterized by: a receiver unit, arranged for reception of MIMO signals $\hat{Y}$ from said radio network node. The UE further includes a processing circuit arranged for pre-detection of said received signals $\hat{Y}$, said pre-detection providing an initial estimation of transmitted signals $\hat{S}$ corresponding to the received signals $\hat{Y}$; arranged for splitting the transmitted signal $\hat{S}$ into a number G of disjoint subgroups $X_g$ of transmitted signals, wherein each one of said number G of subgroups $X_g$ of transmitted signals covers a subgroup $n_g$ of all layers 2L used for said transmitted signals $\hat{S}$; $0 \leq g < G$ and $1 \leq G \leq L$; such that said number G of subgroups $X_g$ of transmitted signals together cover all said layers 2L; arranged for interference cancellation performed on said number G of subgroups $X_g$ of transmitted signals based on said initial estimation of said transmitted signals $\hat{S}$; and arranged for detection of said number G of subgroups $X_g$ of transmitted signals by utilization of a Maximum Likelihood Detection (MLD) algorithm, wherein said subgroup $n_g$ of layers within each one of said number G of subgroups $X_g$ of transmitted signals are detected simultaneously.

A third aspect includes a computer program, characterized in code means, which when run in a computer causes the computer to execute the method; and a computer program product including a computer readable medium and the computer program, wherein said computer program is included in the computer readable medium.

A general concept according to embodiments of the invention is to provide a Quasi-MLD (QMLD) by splitting the transmitted signal into a number of disjoint subgroups of transmitted signals. An intelligent splitting scheme can be utilized for performing the splitting, such that the subgroups are chosen to cover a subgroup of all layers used for the transmitted signal and that the splitting simple and has a low complexity.

Interference cancellation is then implemented, according to an embodiment in a serial configuration, on each subgroup based on information from a pre-detection being performed on the received signals. Hereby, an efficient and low complex interference cancellation is achieved.

Then, detection of each one of the subgroups is performed by utilization of a Maximum Likelihood Detection (MLD) algorithm. At the detection, all layers within each one of the transmitted subgroups are detected simultaneously. Since the subgroup of layers within each subgroup of transmitted signals is smaller than the whole number of layers for the whole transmitted signal, i.e. the non-split signal, the computational complexity for detection of each transmitted subgroup is kept low.

Further, according to an embodiment, a Log-Likelihood Ratio combination is implemented for combining the Log-Likelihood Ratio outputs from the pre-detector and the MLD detector, which results in a better performance and also makes the detection more robust under differing channel and/or signalling conditions.

In other words, the proposed method and UE provide a QMLD, being especially useful for large MIMO systems, e.g. in LTE/LTE-A or other MIMO systems. The method and the UE have good performance, low complexity and are fully compatible to differing numbers of transmitted layers. The method and the UE are further adaptable to provide an efficient QMLD for a large number of different channel and/or signalling conditions.

Other objects, advantages and novel features of the embodiments of the invention will become apparent from the following detailed description.

BRIEF DESCRIPTION OF THE DRAWINGS

Embodiments are described in more detail with reference to attached drawings illustrating examples of embodiments of the invention in which.

DETAILED DESCRIPTION OF INVENTION

Figure 1:
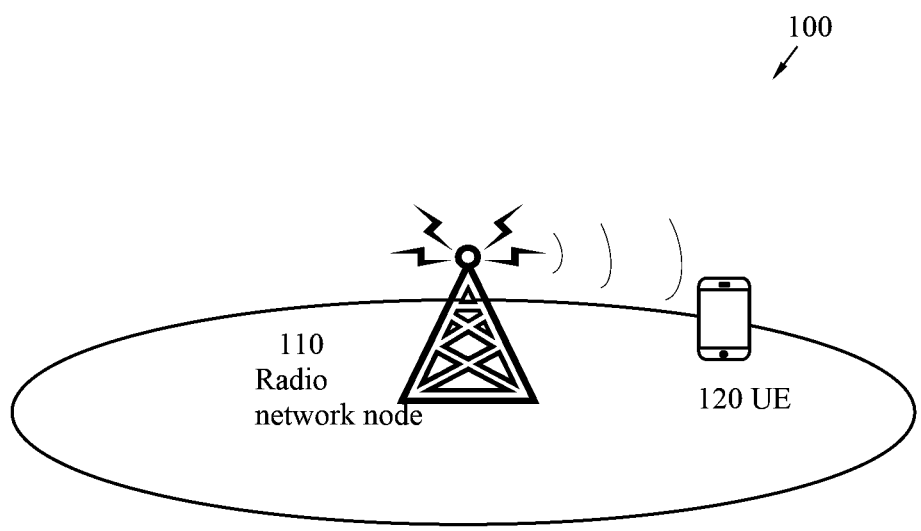
FIG. 1 is a block diagram illustrating a wireless communication network according to some embodiments.

In the following, a description of a used signal model and a more detailed description of conventional detectors and their problems are provided.

In this document, "$\lfloor . \rfloor$" denotes a floor function that maps a real number to the largest integer no greater than itself, "$(.)^T$" denotes a transpose, "$(.)^H$" denotes a conjugation transpose, "$(.)^{-1}$" denotes a matrix inversion, "det(.)" denotes a calculation of a determinant of a matrix, and "I" denotes an identity matrix having a dimension to be understood from the context of the description.

If the number of transmitted MIMO layers at the radio network node is L and the number of antennas used for reception at the UE is R, a model of the received MIMO signal can be written as:

$$Y = HS + N, \quad \text{(eq. 1)}$$

where $Y = (y(0), y(1), y(R-1))^T$ is a received signal at the UE side, being a R×1 sized complex vector; $H = (h(0), h(1), \ldots h(L-1))$ is an effective channel matrix including the actual fading channel, the pre-coding matrix and the cyclic delay diversity matrix; $h(l)(0 \leq l < L)$ is a R×1 sized complex column vector corresponding to the effective channel of the transmitted MIMO layer 1 of the receive antenna array; $S = (s(0), s(1), s(L-1))^T$ is a transmitted signal from the radio network node, being a L×1 sized complex column vector; and N is a zero mean thermal noise with covariance matrix $\sigma^2 I$, N being a R×1 sized complex column vector. Each MIMO layer here uses M-QAM (M=4, 16, 64, etc.) modulation.

The received signal model can also be written in the real domain notation.

If notation $$\hat{Y} = \begin{pmatrix} \text{Re}(Y) \\ \text{Im}(Y) \end{pmatrix}, \hat{H} = \begin{pmatrix} \text{Re}(H) & -\text{Im}(H) \\ \text{Im}(H) & \text{Re}(H) \end{pmatrix}, \hat{S} = \begin{pmatrix} \text{Re}(S) \\ \text{Im}(S) \end{pmatrix} \text{ and } \hat{N} = \begin{pmatrix} \text{Re}(N) \\ \text{Im}(N) \end{pmatrix}$$

is used, equation 1 above is equivalent to:

$$\begin{pmatrix} \text{Re}(Y) \\ \text{Im}(Y) \end{pmatrix} = \begin{pmatrix} \text{Re}(H) & -\text{Im}(H) \\ \text{Im}(H) & \text{Re}(H) \end{pmatrix} \begin{pmatrix} \text{Re}(S) \\ \text{Im}(S) \end{pmatrix} + \begin{pmatrix} \text{Re}(N) \\ \text{Im}(N) \end{pmatrix} \quad \text{(eq. 2)}$$

Thus:

$$\hat{Y} = \hat{H}\hat{S} + \hat{N}$$

Here, the notation "Re(X)" and "Im(X)" is used for extracting the real and the imaginary parts of X, respectively, and for outputting the same size vector or matrix of X. Also, $\hat{H}$ is a 2R×2L sized real matrix and $\hat{N}$ is a 2R×1 sized real noise vector including a covariance matrix $$\frac{\sigma^2}{2}I.$$

$\hat{Y}$ is a 2R×1 sized real column vector being denoted as $\hat{Y}=(\hat{y}(0), \hat{y}(1), \ldots \hat{y}(2R-1))^T$, whereby $y(r)=\hat{y}(r)+\sqrt{-1}\hat{y}(r+R)$, ($0 \le r < R$). $\hat{S}$ is a 2L×1 sized real column vector being denoted as $\hat{S}=(\hat{s}(0), \hat{s}(1), \ldots \hat{s}(2L-1))^T$, whereby $s(l)=\hat{s}(l)+\sqrt{-1}\hat{s}(l+L)$, ($0 \le l < L$). It should be noted that if the complex signal $s(l)$ ($0 \le l < L$) uses M-QAM modulation, the real part $\hat{s}(l)$ and the corresponding imaginary part $\hat{s}(l+L)$ use $\sqrt{M}$-PAM modulation, which maps coded bits to the real part of the M-QAM constellations. Also, the average energy of $\sqrt{M}$-PAM symbols has here been normalized to 0.5, as the M-QAM symbol is normalized to 1.0.

Based on the signal model defined in equation 1, the bit Log-likelihood Ratio (LLR) given by a conventional MLD can be written as:

$$L(b_k) = \log\left(\frac{\sum_{S \in S_{b_k}=1} p(S|Y,H)}{\sum_{S \in S_{b_k}=0} p(S|Y,H)}\right) = \log\left(\frac{\sum_{S \in S_{b_k}=1} p(Y|S,H)p(S)}{\sum_{S \in S_{b_k}=0} p(Y|S,H)p(S)}\right)$$

$$\approx \max_{S \in S_{b_k}=1}\{\log(p(Y|S,H)p(S))\} - \max_{S \in S_{b_k}=0}\{\log(p(Y|S,H)p(S))\}$$

$$= \frac{1}{M}\left\{\max_{S \in S_{b_k}=1}\{\log(p(Y|S,H))\} - \max_{S \in S_{b_k}=0}\{\log(p(Y|S,H))\}\right\}$$

The MLD needs to perform an exhaustive search among all possible transmission Symbols $$S_{b_k=0} \text{ and } S_{b_k=1}.$$

$S_{b_k=0}$ is here a subset of possible transmission symbols with the k-th transmitted bit equal to 0 and $$S_{b_k=1}$$

is a subset of possible transmission symbols with the k-th transmitted bit equal to 1. For 4×4 MIMO with 64QAM for all layers, each one of these subsets includes $64^4/2$ possible transmission symbol combinations, wherefore a huge effort is needed to calculate the LLR value for each transmitted bit. Thus, as stated above, MLD suffers from a prohibitive complexity due to these exhaustive searches.

Based on the signal model defined in equation 1, a conventional LMMSE detector first utilizes Wiener-filtering for the estimation of the received symbols:

$$\tilde{s}(l) = \frac{h(l)^H(HH^H + \sigma^2 I)^{-1}Y}{h(l)^H(HH^H + \sigma^2 I)^{-1}h(l)} = s(l) + n'_l$$

Here, $n'_l$ is the effective zero mean noise after equalization with variance $\sigma'^2_l$. Then, an exhaustive separate search on each MIMO layer is performed to calculate the bit LLRs, $$L(b_k) = \frac{1}{\sigma'^2_l}\left\{\min_{s(l),b_k=0}\{\|\tilde{s}(l)-s(l)\|^2\} - \min_{s(l),b_k=1}\{\|\tilde{s}(l)-s(l)\|^2\}\right\}$$

Here, $b_k$ is the k-th transmitted bit that belongs to the symbol transmitted in the l-th MIMO layer, and $s(l)$ is the possible transmitted symbol at l-th layer. If a 4×4 MIMO with 64 QAM is used for all four MIMO layers, LMMSE only needs to search over 64 possible symbols for each MIMO layer. Also, with serial SIC or parallel PIC interference techniques used, the interference from other MIMO layers can be removed before the detection of a current MIMO layer. After the interference calculation, the equalization and LLR calculation steps are similar to corresponding steps for LMMSE without interference cancellation. However, as stated above, LMMSE suffers from bad performance for spatially correlated channels encountered in typical LTE test cases and real life cases.

A conventional subspace marginalization and interference suppression (SUMIS) detector implements an MLD on a chosen subgroup of transmitted signals for each MIMO layer. The SUMIS detector thus chooses different subgroups when detecting different MIMO layers. Therefore, the complexity is high also for the SUMIS detector. Also, in order to obtain a good performance, the SUMIS detector needs to be run twice to run a purification at a second step. To run the detection twice further doubles the complexity. The SUMIS detector further chooses the subgroups based on a suboptimal channel correlation criteria, which degrades the performance. Thus, the SUMIs detector suffers from high complexity resulting from a need to run the subgroup detection for each layer separately and from the need to perform the purification in order to achieve an acceptable performance.

According to another conventional detector, a group detection method implements an MLD on each subgroup and detects the MIMO layers inside the subgroup at the same time. However, the interference from other subgroups is regarded as noise, which causes huge performance degradations for channels with medium or high correlations, e.g. for channels in which some MIMO layers have a relatively higher channel gain, and therefore pollute the rest of the MIMO layers. The subgroup splitting is here chosen for maximizing the information rate. However, the possible splitting pattern number gets enormous as the layer number increases when using this splitting criteria. Thereby, it is a very difficult and computational demanding task to find the optimal solution. Thus, this conventional detector suffers from lack of interference cancellation between different subgroups and also from the high complexity involved in finding the optimal splitting pattern.

In the following, embodiments of a method and a UE that at least partly will solve the above stated problems are explained in detail, and at least partly in reference to the accompanying drawings.

The embodiments described herein are defined as a user equipment and a method in a user equipment, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

FIG. 1 is a schematic illustration of a wireless communication network 100 comprising a radio network node 110 and a User Equipment (UE) 120.

The wireless communication network 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Spécial Mobile) (GSM) Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1x RTT and High Rate Packet Data (HRPD), just to mention some few options. The expressions "wireless communication network" and "wireless communication system" may within the technological context of this disclosure sometimes be utilized interchange-ably. Further, the wireless communication network 100 may be configured for large MIMO transmission.

The purpose of the illustration in FIG. 1 is to provide a simplified, general overview of the wireless communication network 100 and the involved methods and nodes, such as the radio network node 110 and UE 120 herein described, and the functionalities involved. The methods, radio network node 110 and UE 120 will subsequently, as a non-limiting example, be described in a 3GPP LTE LTE-Advanced environment, but the embodiments of the disclosed methods, radio network node 110 and UE 120 may operate in a wireless communication network 100 based on another access technology such as, e.g., any of the above already enumerated. Thus, although the embodiments of the invention are described based on, and using the notation of, 3GPP LTE systems, it is by no means limited to 3GPP LTE.

The illustrated wireless communication network 100 comprises the radio network node 110, which may send radio signals to be received by the UE 120.

It is to be noted that the illustrated network setting of one radio network node 110 and one UE 120 in FIG. 1 is to be regarded as a non-limiting example of an embodiment only. The wireless communication network 100 may comprise any other number and or combination of radio network nodes 110 and or UEs 120. A plurality of UEs 120 and another configuration of radio network nodes 110 may thus be involved in some embodiments of the disclosed invention.

Thus whenever "one" or "a an" UE 120 and or radio network node 110 is referred to in the present context, a plurality of UEs 120 and or radio network nodes 110 may be involved, according to some embodiments.

The radio network node 110 may, according to some embodiments be configured for downlink transmission, and may be referred to, respectively, as e.g., a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the UE 120 over a wireless interface, depending, e.g., of the radio access technology and or terminology used.

The UE 120 may correspondingly be represented by, e.g. a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 110, according to different embodiments and different vocabulary.

Figure 2:
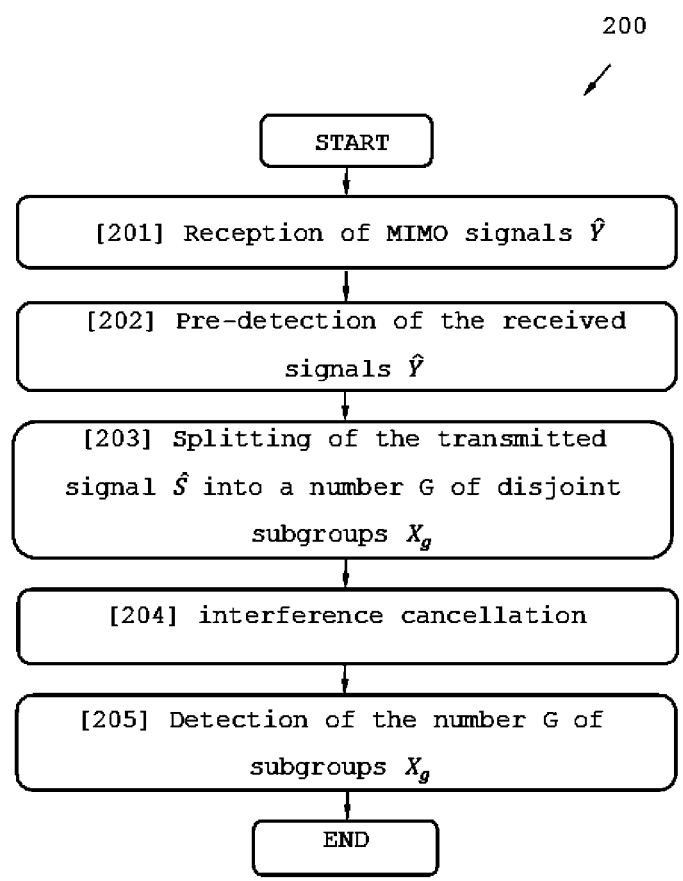
FIG. 2 is a flow chart diagram illustrating a method according to an embodiment.

FIG. 2 is a flow chart illustrating embodiments of an aspect corresponding to a method 200 in a User Equipment (UE) 120, for wireless communication with a radio network node 110 in a wireless communication system 100, where MIMO transmission is utilized at least in the downlink transmission to the UE 120. The radio network node 110 comprises, or is connected to, a multiple antenna array configured for providing MIMO transmission.

The method 200 may comprise a number of steps 201-205.

In a first step 201 of the method, a reception of the transmitted MIMO signals $\hat{Y}$ from the radio network node 110 is performed by the UE 120.

In a second step 202 of the method, a pre-detection of the received signals $\hat{Y}$ is performed by the UE 120. The pre-detection provides an initial estimation of the transmitted signals $\hat{S}$ corresponding to the received signals $\hat{Y}$.

In a third step 203 of the method, a splitting of the transmitted signal $\hat{S}$ into a number G of disjoint subgroups $X_g$ of transmitted signals is performed by the UE. Each one of the number G of subgroups $X_g$ of transmitted signals here covers a subgroup $n_g$ of all layers 2L used for the transmitted signal $\hat{S}$; $0 \leq g < G$ and $1 \leq G \leq L$; such that the number G of subgroups $X_g$ of transmitted signals together cover all of the layers 2L. Thus, each one of subgroup $n_g$ includes at least 2 and at most 2L MIMO layers; $2 \leq n_g \leq 2L$.

In a fourth step 204 of the method, an interference cancellation is performed by the UE 120 on the number G of subgroups $X_g$ of transmitted signals based on the initial estimation of the transmitted signals $\hat{S}$ resulting from the pre-detection of the second step 202 of the method.

In a fifth step 205 of the method, a detection of the number G of subgroups $X_g$ of transmitted signals is performed by the UE 120 by utilization of a Maximum Likelihood Detection (MLD) algorithm. According to the method, the subgroup $n_g$ of layers within each one of the number G of subgroups $X_g$ of transmitted signals are detected simultaneously.

It is to be noted that any, some, or all of the above described steps 201-205 may be performed in a somewhat different chronological order than the enumeration indicates, be performed simultaneously or even be performed in reversed order. Further, it is to be noted that some actions may be performed in a plurality of alternative manners according to different embodiments.

Figure 3:
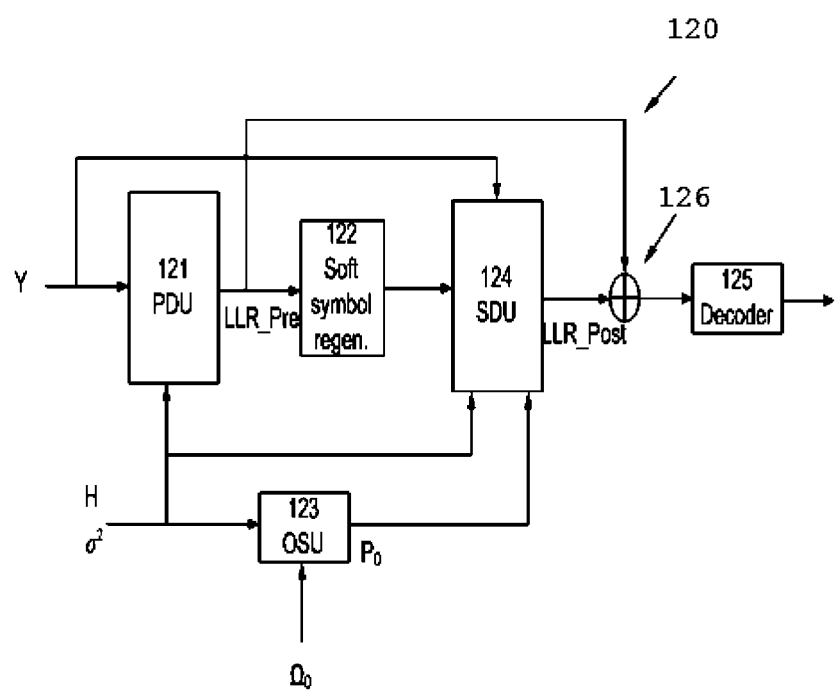
FIG. 3 is a block diagram illustrating a method/configuration of a UE according to an embodiment.

FIG. 3 is a block diagram schematically illustrating parts of a UE 120 in a wireless communication network 100. The UE 120 is configured for performing the above mentioned method 200 according to the steps 201-205 for downlink wireless MIMO communication with the radio network node 110 in the wireless communication system 100.

The user equipment 120 is thus arranged for receiving wireless transmissions from a radio network node 110 in a wireless communication system 100. The User equipment may for this task include a receiving unit (not shown). The receiving unit is then arranged for reception 201 of MIMO signals $\hat{Y}$ from the radio network node 110.

The user equipment 120 also includes a pre-detection unit (PDU) 121, which is arranged for pre-detection 202 of the received signals $\hat{Y}$. The pre-detection unit 121 is arranged for providing an initial estimation of transmitted signals $\hat{S}$ corresponding to the signals $\hat{Y}$ being received.

The user equipment 120 further includes a splitting unit 123, also called Optimal Splitting Unit (OSU), which is arranged for splitting 203 the transmitted signal $\hat{S}$ into a number G of disjoint subgroups $X_g$ of transmitted signals. Here, each one of the number G of subgroups $X_g$ of transmitted signals covers a subgroup $n_g$ of all layers 2L used for the transmitted signal $\hat{S}$, where $0 \le g < G$ and $1 \le G \le L$. Thus, the number G of subgroups $X_g$ of transmitted signals together cover all of the MIMO layers 2L used for the transmission.

The user equipment 120 also includes an interference cancellation unit (not shown), which is arranged for performing interference cancellation 204 on the number G of subgroups $X_g$ of transmitted signals. The interference cancellation is based on the initial estimation of the transmitted signals $\hat{S}$.

The user equipment also includes a detection unit 124, also called a Subgroup Detection Unit (SDU), arranged for detection 205 of the number G of subgroups $X_g$ of transmitted signals. The detection unit 124 utilizes a Maximum Likelihood Detection (MLD) algorithm, in which the subgroup $n_g$ of layers within each one of said number G of subgroups $X_g$ of transmitted signals are detected simultaneously.

The user equipment may further include a decoder 125 arranged for decoding the detected wireless MIMO communication signal.

Figure 4:
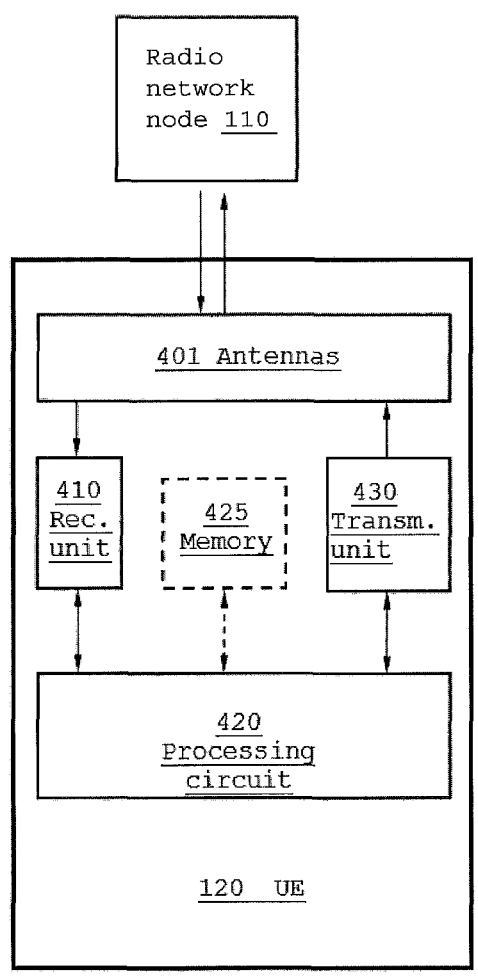
FIG. 4 is block diagram illustrating a UE and a radio network node according to an embodiment.

FIG. 4 schematically shows a UE. The UE includes one or more antennas 401, possibly, a multiple antenna array 401 configured for MIMO reception and/or transmission MIMO transmission.

For enhanced clarity, any internal electronics or other components of the UE 120 not entirely essential for understanding the herein described embodiments have been omitted from FIG. 4.

The UE 120 comprises a receiver unit 410, configured for receiving wireless signals.

Also, the UE 120 comprises a processing circuit 420. The processing circuit 420 is configured for performing the method steps being described in this document, i.e. the above mentioned steps 201-205, and also below described method steps.

Thus, the processing circuit 420 is configured/arranged for performing the above described step for pre-detection 202 of the received signals $\hat{Y}$, where the pre-detection provides an initial estimation of transmitted signals $\hat{S}$ corresponding to the received signals $\hat{Y}$.

The processing circuit 420 is also configured/arranged for splitting 203 the transmitted signal $\hat{S}$ into a number G of disjoint subgroups $X_g$ of transmitted signals, wherein each one of the number G of subgroups $X_g$ of transmitted signals covers a subgroup $n_g$ of all layers 2L used for the transmitted signal $\hat{S}$; $0 \le g < G$ and $1 \le G \le L$; such that the number G of subgroups $X_g$ of transmitted signals together cover all the layers 2L.

The processing circuit 420 is also configured/arranged for interference cancellation 204 performed on the number G of subgroups $X_g$ of transmitted signals based on the initial estimation of the transmitted signals $\hat{S}$.

The processing circuit 420 is also configured/arranged for detection 205 of the number G of subgroups $X_g$ of transmitted signals by utilization of a Maximum Likelihood Detection (MLD) algorithm, wherein the subgroup $n_g$ of layers within each one of the number G of subgroups $X_g$ of transmitted signals are detected simultaneously.

The processing circuit 420 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The herein utilized expression "processing circuit" may thus represent a processing circuitry comprising a plurality of processing circuits, such as, e.g., any, some or all of the ones enumerated above.

The processing circuit 420 may further perform data processing functions for inputting, outputting, and processing of data comprising data buffering and device control functions, such as call processing control, user interface control, or the like.

Also, the UE 120 comprises a transmitter unit 430, configured for transmitting signals to be received by the radio network node 110.

Furthermore, the UE 120 may comprise at least one memory 425, according to some embodiments. The memory 425 may comprise a physical device utilized to store data or programs, i.e., sequences of instructions, on a temporary or permanent basis. According to some embodiments, the memory 425 may comprise integrated circuits comprising silicon-based transistors. Further, the memory 425 may be volatile or non-volatile.

The previously described method steps 201-205, and any other method steps described in this document, to be performed in the UE 120 may be implemented through the one or more processing circuits 420 in the UE 120, together with computer program code for performing the functions of the method steps. Thus a computer program product, comprising instructions for performing the method steps 201-205, and other method steps in the UE 120 may perform the method 200 for wireless communication with a radio network node 110 in a wireless communication system 100, when the computer program product is loaded in a processing circuit 420 of the UE 120.

The computer program product mentioned above may be provided for instance in the form of a data carrier carrying computer program code for performing any, at least some, or all of the method steps 201-205, and any other method steps described in this document, according to some embodiments when being loaded into the processing circuit 420. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the UE 120 remotely, e.g., over an Internet or an intranet connection.

In the following, a description of the pre-detection unit (PDU) 121, and its functionality for pre-detection, is given.

An initial step for the method of the UE is to apply a pre-detection on the received MIMO signal in order to provide an initial estimation of the transmitted symbols. An LMMSE detector using Parallel Interference Cancellation (LMMSE-PIC) can for example be used for this pre-detection, but essentially any detector that can provide an initial estimation of transmitted signals can also be used for this pre-detection.

The LMMSE-PIC is self-iterated and excludes the outer Error Correction Code (ECC) decoder. Based on the used signal model in equation 2, the transmitted signal can be pre-detected as:

$$\bar{s}(l) = \frac{\hat{h}(l)^H (\hat{H}\hat{H}^H + \sigma^2 I)^{-1} Y}{\hat{h}(l)^H (\hat{H}\hat{H}^H + \sigma^2 I)^{-1} \hat{h}(l)} = \hat{s}(l) + n'_l, \; 0 \le l < 2L \quad \text{(eq. 3)}$$

$n'_l$ is here the noise, after equalization, for the l-th symbol. The power values for both the transmitted signal and the noise are in the real domain half of their power values in the complex domain. Therefore, the Signal to Noise Ration (SNR) for the real domain in equation 3 corresponds to the SNR in the complex domain.

After detection, the Log-Likelihood Ration (LLR) for the q-th bit in the transmitted signal $\hat{s}(l)$ is calculated by:

$$L(b_{q,l}) = \frac{1}{2\sigma_l'^2} \left\{ \begin{array}{l} \min_{\hat{s}(l) \in S(l), b_{q,l}=0} \{\|\hat{s}(l) - \bar{s}(l)\|^2\} - \\ \min_{\hat{s}(l) \in S(l), b_{q,l}=1} \{\|\hat{s}(l) - \bar{s}(l)\|^2\} \end{array} \right\} \quad \text{(eq. 4)}$$

Here, S(l) is a set of possible transmitted Pulse Amplitude Modulated (PAM) signals corresponding to $\hat{s}(l)$.

As stated above, the pre-detector used can also include PIC, such that an LMMSE-PIC pre-detection is provided. With the LLR values obtained, the soft symbol estimation $\hat{s}(l)$ of the transmitted signal $\hat{s}(l)$ and the estimation variance $\tilde{c}(l)$ can be regenerated as:

$$\tilde{s}(l) = E(\hat{s}(l)) = \sum_{\hat{s}(l) \in S(l)} \hat{s}(l) p(\hat{s}(l)) \quad \text{(eq. 5)}$$

$$\tilde{c}(l) = $$

$$E(|\hat{s}(l)|^2) - |E(\hat{s}(l))|^2 = \sum_{\hat{s}(l) \in S(l)} (\hat{s}(l))^2 p(\hat{s}(l)) - \left( \sum_{\hat{s}(l) \in S(l)} \hat{s}(l) p(\hat{s}(l)) \right)^2$$

Here, the probability $p(\hat{s}(l))$ for each symbol $\hat{s}(l)$ mapped from bit $b_{0,l}, b_{1,l}, \ldots, b_{Q-1,l}$ is calculated as $p(\hat{s}(l)) = \Pi_{q=0}^{Q-1} \frac{1}{2}(1+(2b_{q,l}-1)\tan h(L(b_{q,l})))$, where Q is the number of bits that are mapped to one real PAM symbol, $b_{q,l}$ equals to 0 or 1 and $L(b_{q,l})$ ($0 \le q < Q$) is the corresponding LLR value for bit $b_{q,l}$ calculated in equation 4.

If the regenerated soft symbol vector is defined as $\tilde{S} = (\tilde{s}(0), \tilde{s}(1), \ldots \tilde{s}(2L-1))^T$, and the corresponding diagonal variance matrix is defined as $$\tilde{C} = \begin{pmatrix} \tilde{c}(0) & & & \\ & \tilde{c}(1) & & \\ & & \ddots & \\ & & & \tilde{c}(2L-1) \end{pmatrix},$$

the updated symbol estimation for l-th symbol utilizing LMMSE-PIC is given by:

$$\bar{s}(l) = \tilde{s}(l) + \frac{\hat{h}(l)^H (\hat{H}\tilde{C}\hat{H}^H + \sigma^2 I)^{-1} (Y - H\tilde{S})}{\hat{h}(l)^H (\hat{H}\tilde{C}\hat{H}^H + \sigma^2 I)^{-1} \hat{h}(l)} = \hat{s}(l) + n''_l, \quad \text{(eq. 6)}$$

$$0 \le l < 2L$$

where $n''_l$ is the noise after a second equalization for the l-th symbol.

The pre-detection described here, using PIC, will result in a better soft symbol estimation, since the interference from other symbols has been removed before the estimation of the current symbol is performed. Thus, first an internal soft symbol regeneration is performed. Thereafter, based on the updated symbol estimation $\bar{s}(l)$, the final LLR values, LLR_Pre, can be calculated again based on equation 4, and can then be used in a LLR combination described below. The soft symbol information derived from equation 5 is also updated accordingly and can be used in an interference cancellation process described below for a Subgroup Detection Unit (SDU).

As stated above, splitting of the transmitted signal $\hat{S}$ into the number G of subgroups $X_g$ of transmitted signals is performed by the UE. According to an embodiment, this splitting includes the step of choosing a splitting pattern based on an evaluation of Achievable Information data Rates $AIR_g$ for each one of a number G of subgroups $T_g$ of an effective channel matrix $\hat{H}$, which is split according to the splitting pattern being used for splitting of the transmitted signal $\hat{S}$ into the number G of subgroups $X_g$ of transmitted signals.

The evaluation of the Achievable Information data Rates $AIR_g$ can here include the step of identifying a permutation $\hat{P}$ corresponding to a maximum for a sum of the achievable information data rates $AIR_g$. This identified permutation $\hat{P}$ is then sorted, i.e. its elements are moved/permuted, such that elements $\{C_0, C_1, \ldots, C_{G-1}\}$ corresponding to the permutation $\hat{P}$ are arranged in ascending value order $\{C'_0, C'_1, \ldots, C'_{G-1}\}$; $C'_m < C'_n$ when $0 \le m < n < G$. The method steps for splitting the transmitted signal $\hat{S}$ and for evaluation of the Achievable Information data Rates $AIR_g$ are hereafter descried in more detail.

The received signal model, i.e. the transmitted signal $\hat{S}$, described in equation 2 is split into G subgroups, where each subgroup includes $n_g$ MIMO layers ($0 \le g < G$). The G subgroups should be disjoint and should cover all MIMO layers. In this document, disjoint subgroups means that each subgroup includes different transmitted symbols, i.e. that each transmitted symbol is present in only one subgroup.

Since the transmitted signal $\hat{S}$ is a 2L×1 sized real column vector $\hat{S} = (\hat{s}(0), \hat{s}(1), \hat{s}(2L-1))^T$, which is split into G subgroups, the MIMO layers of all subgroups together add up to 2L:

$$\Sigma_{g=0}^{G-1} n_g = 2L \quad \text{(eq. 7)}$$

The choice of the number of subgroups G is flexible, and can be seen as a trade-off between complexity and performance. When G has a small value, more MIMO layers are jointly detected as one subgroup, thus a better performance is achievable. For higher values of G, i.e. for increasing values of G, a complexity reduction is achieved. However, higher values for G also result in a performance degradation.

For example, if G is set to the value 1; G=1; there is only one subgroup which includes all the 2L MIMO layers. This choice corresponds to a full complexity MLD, which has a very good performance. If G is set to L; i.e. G=L; only two single real symbols are detected per subgroup, which degrades the performance to the performance level of the LMMSE. Thus, at high and low values for G, i.e. at the low and high complexity ends, the performance of the proposed detector corresponds to an LMMSE and an MLD, respectively.

According to an embodiment, the overall complexity is reduced, the processing latency is reduced, and the hardware is made reusable by having an identical number $n_g$ of MIMO layers in each one of the G different subgroups.

However, since the number of all MIMO layers 2L may not be divided by G such that an integer results, a general form of the number of MIMO layers in each subgroup $n_g$ can be defined as:

$$n_g = \begin{cases} \left\lfloor \frac{2L}{G} \right\rfloor + 1, & 0 \le g < g_0 \\ \left\lfloor \frac{2L}{G} \right\rfloor, & g_0 \le g < G \end{cases} \quad \text{(eq. 8)}$$

Here, $$g_0 = 2L - G\left\lfloor \frac{2L}{G} \right\rfloor.$$

For instance, if L=4 and G is chosen as 2; G=2; then each subgroup includes the same number of layers $n_g$=4, g=0,1. However, if L=4 and G is chosen as 3; G=3; then 2L is not divisible by G such that an integer results, wherefore the first (g=0) and second (g=1) subgroups will include one more MIMO layer than the third (g=2) subgroup, thus:

$$n_g = \begin{cases} 3, & g = 0, 1 \\ 2, & g = 2 \end{cases}$$

Each splitting pattern can be seen as a permutation of the columns of the channel matrix $\hat{H}$ and of the rows of the transmitted signal $\hat{S}$.

If a set of all the possible different candidate permutation vectors is denoted as $\Omega$, and $P(i)=[i(0), i(1), \ldots, i(2L-1)] \in \Omega$ is a permutation of the integer index $[0, 1, \ldots, 2L-1]$, then a splitting pattern of the effective channel matrix $\hat{H}$ and of the transmitted signal $\hat{S}$ given by $P(i)$ is defined as:

$$\hat{H} = \quad \text{(eq. 9)}$$

$$(\hat{h}(0), \hat{h}(1), \ldots \hat{h}(2L-1)) \xrightarrow{P(i)} (\hat{h}(i(0)), \hat{h}(i(1)), \ldots \hat{h}(i(2L-1))) =$$

$$(T_0, T_1, \ldots T_{G-1})$$

$$\hat{S} = (\hat{s}(0), \hat{s}(1), \ldots \hat{s}(2L-1)) \xrightarrow{P(i)}$$

$$(\hat{s}(i(0)), \hat{s}(i(1)), \ldots \hat{s}(i(2L-1)))^T = (X_0^T, X_1^T, \ldots X_{G-1}^T)$$

Here, $(T_0, T_1, \ldots T_{G-1})$ is the split channel vector of length G and $(X_0^T, X_1^T, \ldots X_{G-1}^T)$ is the split transmitted signal vector of length G. As a non-limiting example, if L is 4; L=4; and G is 4; G=4; then 2L=8, and each element of the split channel vector and the split transmitted signal includes 2 real symbols, respectively.

More in detail, $T_0 = (\hat{h}(i(0)), \hat{h}(i(1)), \ldots \hat{h}(i(n_0-1)))$ is the split channel matrix for the first subgroup, where the indexes for $(\hat{h}(i(0)), \hat{h}(i(1)), \ldots \hat{h}(i(n_0-1)))$ correspond to a split version of $\hat{H}$ having a split/permuted index version of k being denoted i(k) and being defined above by the permutation $P(i)=[i(0), i(1), \ldots, i(2L-1)] \in \Omega$.

$X_0 = (\hat{s}(i(0)), \hat{s}(i(1)), \ldots \hat{s}(i(n_0-1)))^T$ is the split transmitted real signal vector for the first subgroup. Further, $T_g = (\hat{h}(i(\Sigma_{t=0}^{g-1} n_t)), \hat{h}(i(\Sigma_{t=0}^{g-1} n_t + 1)), \ldots \hat{h}(i(\Sigma_{t=0}^{g} n_t - 1)))$ is the split channel matrix for the g-th subgroup ($1 \le g < G$), and $X_g = (\hat{s}(i(\Sigma_{t=0}^{g-1} n_t)), \hat{s}(i(\Sigma_{t=0}^{g-1} n_t + 1)), \ldots \hat{s}(i(\Sigma_{t=0}^{g} n_t - 1)))^T$ is the split transmitted real signal vector for the g-th subgroup ($1 \le g < G$).

After the splitting, the received signal can be written as:

$$\hat{Y} = \hat{H}\hat{S} + \hat{N} = \Sigma_{g=0}^{G-1} T_g X_g + \hat{N} \quad \text{(eq. 10)}$$

Theoretically, there are F(2L, G) different permutation vectors to split 2L signals into G subgroups according to equation 8, regardless of the order of the different subgroups and also of the order of the different signals inside the subgroups.

F(2L, G) can be calculated as:

$$F(2L, G) = \frac{(2L)!}{(G-g_0)! g_0! \left(\left\lfloor \frac{2L}{G} \right\rfloor!\right)^{G-g_0} \left(\left(\left\lfloor \frac{2L}{G} \right\rfloor + 1\right)!\right)^{g_0}} \quad \text{(eq. 11)}$$

Here, $g_0 = 2L - G\left\lfloor \frac{2L}{G} \right\rfloor$ as defined above.

As an non-limiting example, for L=4 and G=4, the channel matrix H includes 2L=8 columns. By splitting the columns into 4 subgroups there will be in total F(2L, G)= 8!/4!(2!)^4=105 different permutations. These different permutations can, according to an embodiment, be pre-calculated and stored as the set $\Omega$.

The achievable information rate (AIR) for each subgroup g can be calculated as:

$$AIR_g = \log_2 det(I + T_g^H (\Sigma_{0 \le m < G, m \ne g} T_m T_m^H + \sigma^2 I)^{-1} T_g),$$
$$0 \le g < G \quad \text{(eq. 12)}$$

A matrix inversion based on the Woodbury matrix identity can be used:

$$I + T_g^H \left(\sum_{0 \le m < G, m \ne g} T_m T_m^H + \sigma^2 I\right)^{-1} T_g = \quad \text{(eq. 13)}$$

$$\left(I + T_g^H \left(\sum_{0 \le m < G} T_m T_m^H + \sigma^2 I\right)^{-1} T_g\right)^{-1} =$$

$$\left(I + T_g^H (\hat{H}\hat{H}^H + \sigma^2 I)^{-1} T_g\right)^{-1}, 0 \le g < G,$$

And if $C_g$ is defined as:

$$C_g = det(I + T_g^H (\hat{H}\hat{H}^H + \sigma^2 I)^{-1} T_g), 0 \le g < G, \quad \text{(eq. 14)}$$

Then, an optimal permutation vector $\hat{P}$ can be found through maximizing a sum of achievable information rates of all subgroups of the candidate set $\Omega$, $$\hat{P} = \arg\max_{P(i) \in \Omega} \{\Sigma_{g=0}^{G-1} AIR_g\} \propto \arg\min_{P(i) \in \Omega}$$
$$\{\Pi_{g=0}^{G-1} C_g\} \qquad \text{(eq. 15)}$$

After an optimal permutation vector $\hat{P}$ has been found, there is according to an embodiment, one more step to perform for achieving the optimal splitting pattern.

The values $\{C_0, C_1, \ldots C_{G-1}\}$ corresponding to the optimal permutation vector $\hat{P}$ are according to the embodiment sorted in ascending value order and are denoted as $\{C'_0, C'_1, \ldots, C'_{G-1}\}$. Thus, $C'_m < C'_n$, when $0 \leq m < n < G$, such that the elements are sorted (indexes are switched) in relation to the order of magnitude for the elements. The optimal permutation vector $\hat{P}$ is then permuted according to the sorted element order, i.e. the indexes for the different subgroups are switched in correspondence with their ascending value order, and is denoted $P_0$.

$P_0$ thus indicates the new sorted splitting pattern $\{C'_0, C'_1, \ldots C'_{G-1}\}$. $P_0$ is the final output optimal splitting pattern, and the effective channel matrix $\hat{H}$ and the transmitted signal $\hat{S}$ are split according to this output optimal splitting pattern in the way described in connection with equation 9. The step of sorting the elements in relation to the order of magnitude for the elements guarantees that a subgroup with a higher AIR is detected before a subgroup with a lower AIR, which results in a better interference cancellation between the subgroups.

According to an embodiment of the method, the set $\Omega$ of all preferable permutations is constructed as including permutations $\hat{P}$ corresponding to a splitting which fulfils a number of conditions. When $F(2L, G)$ is large, i.e. when a large number of different permutation splitting are possible, the complexity of searching among the whole permutation set $\Omega$ uses a lot of computational resources and is unaffordable. According to an embodiment of the method, in order to reduce the complexity, three simple rules/conditions are utilized as guidelines when constructing the candidate set $\Omega$. A preferable permutation should only be added to the set $\Omega$, only if all of these three conditions are fulfilled. In other words, if either of three these rules/conditions are not satisfied for a permutation vector, that permutation vector will not be included in set $\Omega$.

These three rules/conditions are:

1: If a real part of a first element of an original complex transmitted signal $s(i)$ is in a same subgroup $X_g$ as a real part of a second element of the original complex transmitted signal $s(j)$; ($i \neq j$, $0 \leq i, j < L$); then an imaginary part of the first element of the original complex transmitted signal $s(i)$ shall be in a same subgroup $X_g$ as an imaginary part of the second element of the original complex transmitted signal $s(j)$; and vice visa;

2: If a real part of a first element of an original complex transmitted signal $s(i)$ is in a same subgroup $X_g$ as an imaginary part of a second element of an original complex transmitted signal $s(j)$; ($i \neq j$, $0 \leq i, j < L$); then an imaginary part of the first element of the original complex transmitted signal $s(i)$ shall be in a same subgroup $X_g$ as a real part of the second element of the original complex transmitted signal $s(j)$; and vice visa;

3: A real part and an imaginary part of an element of an original complex transmitted signal $s(i)$; ($0 \leq i < L$), shall be in different subgroups.

These three rules/conditions are easily implemented and straightforward, and are based on the fact that the channel vectors for the real and imaginary part of the same transmitted complex signal are orthogonal, as is defined in equation 2.

The first two rules are designed based on the realization that that if jointly processing the real part of the complex transmitted signal $s(i)$, ($0 \leq i < L$) with the real (or imaginary) part of the complex transmitted signal $s(j)$, ($j \neq i$, $0 \leq j < L$)) is advantageous, this is an indication that the channel vectors are highly correlated. Therefore, it is also advantageous to jointly process the imaginary part of the complex transmitted signal $s(i)$ with the imaginary (or real) part of the complex transmitted signal $s(j)$, since their channel vectors are also highly correlated.

The last rule is designed based on the realization that there is no gain in jointly processing the real and imaginary parts of the same transmitted complex signal, since their channel vectors are orthogonal to each other.

To construct the set $\Omega$ of all preferable permutations as only including permutations $\hat{P}$ corresponding to a splitting which fulfils the above stated conditions, a major complexity reduction can be achieved.

Figure 5:
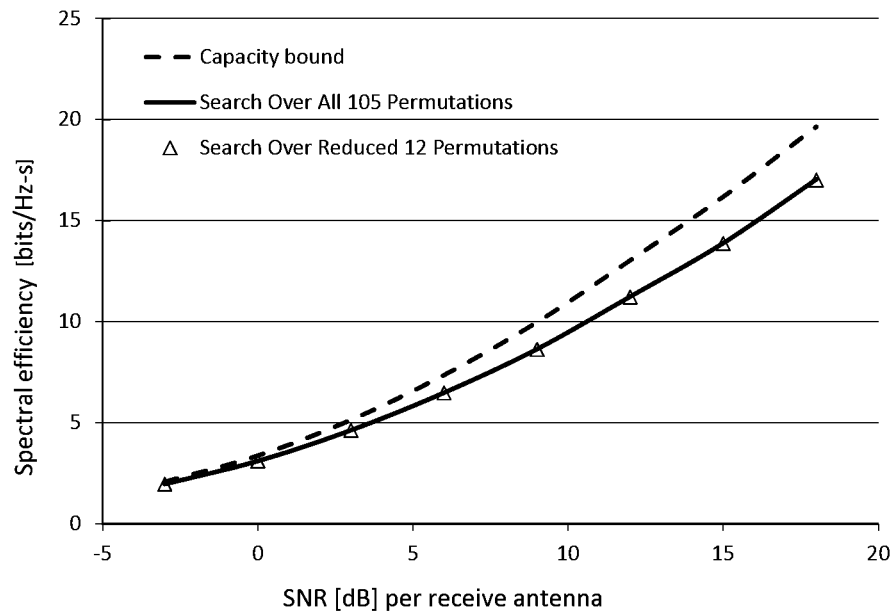
FIG. 5 is a diagram illustrating performance of an embodiment.

As a non-limiting example, after the reduction using these conditions/rules, for $L=4$ and $G=4$, the permutations can be reduced from 105 to only 12 candidates in set $\Omega$. In FIG. 5, the maximal achievable information rate for all possible 105 permutation vectors and for the reduced 12 permutation vectors being chosen by these rules/conditions are shown. The maximal achievable information rates for all possible 105 permutation vectors and for the reduced 12 permutation essentially coincide. Table 1 gives the test/simulation results. In this example, a Gaussian channel $\hat{H}$ is used for the test/simulation and the noise density is $\sigma^2$. The capacity upper bound is given by $\log_2 \det$ $$\left(I + \frac{\hat{H}\hat{H}^H}{\sigma^2}\right).$$

TABLE 1

| | Spectral Efficiency [bits/Hz-s] | | |
|---|---|---|---|
| SNR [dB] per Receive Antenna | Capacity bound | Search Over All 105 Permutations | Search Over Reduced 12 Permutations |
| −3 | 2.0744 | 1.9596 | 1.9595 |
| 0 | 3.3675 | 3.1028 | 3.0997 |
| 3 | 5.1323 | 4.624 | 4.6174 |
| 6 | 7.3553 | 6.4796 | 6.47 |
| 9 | 9.9714 | 8.6399 | 8.6256 |
| 12 | 13.0298 | 11.2366 | 11.2172 |
| 15 | 16.178 | 13.8822 | 13.8596 |
| 18 | 19.6404 | 17.0345 | 17.0027 |

According to an embodiment of the method, all preferable permutations of the set $\Omega$, i.e. all permutations fulfilling the above three rules/conditions, are pre-calculated and stored in a memory. This reduces the computational burden for the UE when processing received signals.

According to an embodiment of the method, the interference cancellation step 204 includes utilization of soft information $\tilde{X}_g$ corresponding to each one of the subgroup $X_g$, respectively. The soft information $\tilde{X}_g$ is here determined at the initial estimation of transmitted signals $\hat{S}$ of the pre-detection step 202 by being performed by the pre-detection unit 121.

The interference cancellation 204 can include the general steps of removing interference from other subgroups in each subgroup $X_g$, determining a whitening matrix $W_g$ related to each subgroup $X_g$, multiplying an effective channel matrix $T_g$ corresponding to each subgroup $X_g$ with the determined whitening matrix $W_g$, and performing a QR-decomposition of the combined multiplied effective channel matrix $T_g$ and whitening matrix $W_g$. A QR-decomposition can generally be described as a decomposition of a generally denoted matrix A into two matrixes Q and R, i.e. A=Q*R, where Q is a unitary matrix and R is an upper triangle matrix. These steps of the interference cancellation 204 are explained more in detail in the following.

If the signal model after optimal splitting is denoted as:

$$\hat{Y} = \sum_{g=0}^{G-1} T_g X_g + \hat{N}, \quad \text{(eq. 16)}$$

then a split of the soft information output from the Pre-detection Unit 121 can be written as:

$$\Gamma_0 = \{\tilde{X}_0, \tilde{X}_1, \ldots, \tilde{X}_{G-1}\}, \Im = \{\tilde{V}_0, \tilde{V}_1, \ldots, V_{G-1}\}, \quad \text{(eq. 17)}$$

where $\hat{X}_g$ is the soft symbol estimation output from the pre-detector corresponding to the subgroups $X_g$, and $\hat{V}_g$ is a diagonal variance matrix comprising the estimation variance for the g-th subgroup.

The interference cancellation between subgroups according to an embodiment of the proposed method is implemented in a serial way. This means that when the subgroup g (0≤g<G) is detected, the previous subgroup k (0≤k<g) has already been detected and the LLR values have already been calculated for the previous subgroup k (0≤k<g). Therefore, the soft information regeneration for subgroup k can be obtained based on equation 5.

If $\hat{X}_k$ is a soft symbol estimation corresponding to the k:th subgroup $X_k$ of the transmitted signal and the diagonal variance matrix is $\hat{V}_k$ corresponding to the previous k:th subgroup $X_k$ of the transmitted signal, then the soft information defined in equation 17 is updated for all k:th subgroups (0≤k<g) as:

$$\Gamma_g = \{\hat{X}_0, \hat{X}_1, \ldots, \hat{X}_{g-1}, \tilde{X}_g, \ldots, \tilde{X}_{G-1}\} \Im_g = \{\hat{V}_0, \hat{V}_1, \ldots, \hat{V}_{g-1}, \tilde{V}_g, \ldots, \tilde{V}_{G-1}\}, 1 \leq g < G \quad \text{(eq. 18)}$$

It should be noted that for the first subgroup, when g=0, there is no information that can be updated and the used soft information is defined in equation 17 directly for the detection of this first subgroup g=0.

According to an embodiment of the method, the Subgroup Detection Unit 124 includes a number of Subgroup Process units (SGP Unit). Preferably the number of SGP units correspond to the number of subgroups G.

Figure 6:
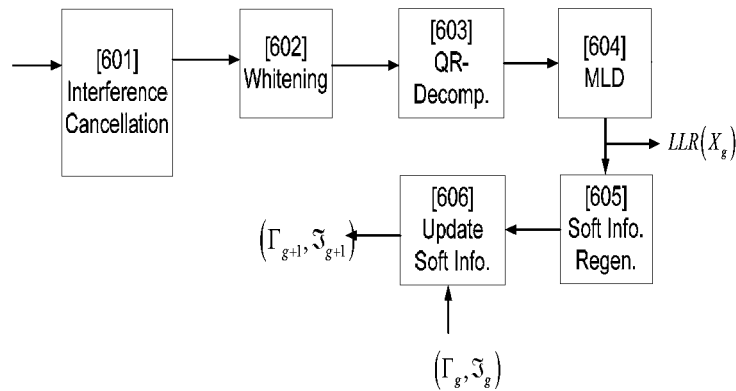
FIG. 6 is a block diagram illustrating a method/configuration of a UE according to an embodiment.

FIG. 6 schematically shows a blocks diagram for a SGP unit, being implemented in the Subgroup Detection Unit SDU. In a first step 601, the interference from other subgroups is removed from received signal:

$$\hat{Y}_g = \hat{Y} - \sum_{0 \leq m < g} T_m \hat{X}_m - \sum_{g < m < G} T_m \tilde{X}_m \quad \text{(eq. 19)}$$

$$= T_g X_g + \sum_{0 \leq m < g} T_m (X_m - \hat{X}_m) + \sum_{g < m < G} T_m (X_m - \tilde{X}_m) + \hat{N},$$

$$0 \leq g < G$$

Here, the residual interference and noise can be seen as a Gaussian noise with zero mean, and the covariance matrix can be calculated as:

$$\sum_{0 \leq m < g} T_m \hat{V}_m T_m^H + \sum_{g < m < G} T_m \tilde{V}_m T_m^H + \frac{\sigma^2}{2} I.$$

In a second step 602, a whitening matrix is determined using a Cholesky-decomposition. Hereby, a 2R×2R whitening matrix $W_g$ satisfying $$W_g \left( \sum_{0 \leq m < g} T_m \hat{V}_m T_m^H + \sum_{g < m < G} T_m \tilde{V}_m T_m^H + \frac{\sigma^2}{2} I \right) W_g^H = I$$

is calculated as:

$$W_g = \left( \sum_{0 \leq m < g} T_m \hat{V}_m T_m^H + \sum_{g < m < G} T_m \tilde{V}_m T_m^H + \frac{\sigma^2}{2} I \right)^{-\frac{1}{2}} \quad \text{(eq. 20)}$$

Further, a QR-decomposition is performed in a third step 603. If the QR-decomposition is $$W_g T_g = Q_g \begin{pmatrix} R_g \\ 0 \end{pmatrix},$$

$Q_g$ is 2R×2R unitary matrix, $R_g$ is an $n_g \times n_g$ upper-triangular matrix, and O is the zero matrix with dimension $(2R-n_g) \times n_g$, then the received signal after noise whitening and QR-decomposition can be written as:

$$\tilde{Y}_g = Q_g^H W_g \hat{Y}_g = \begin{pmatrix} R_g \\ 0 \end{pmatrix} X_g - \quad \text{(eq. 21)}$$

$$Q_g^H W_g \left( \sum_{0 \leq m < g} T_m (X_m - \hat{X}_m) + \sum_{g < m < G} T_m (X_m - \tilde{X}_m) + \hat{N} \right)$$

Since the remaining $2R-n_g$ rows of $\tilde{Y}_g$ include only noise, only the first $n_g$ rows in equation 21 are used for detection in a fourth MLD step 604:

$$\tilde{Y}_g(1:n_g) = R_g X_g + N'_g \quad \text{(eq. 22)}$$

$\tilde{Y}_g(1:n_g)$ here includes the first $n_g$ rows of $\tilde{Y}_g$ and $N'_g$ includes the first $n_g$ rows of the effective noise in equation 21, which is White Gaussian Noise (WGN) with a covariance matrix being equal to the identity matrix.

Then, the MLD can be applied on the received signal model of equation 22 to output LLR values. The received signal model of equation 22 is a $n_g \times n_g$ MIMO signal model. It should be noted that $n_g$ is much smaller than the total number 2L of MIMO layers; $n_g << 2L$. Therefore, the proposed detection method has a considerably lower complexity level than the conventional MLD detection due to the much smaller signal model size.

Thus, the detection 204 of transmitted signals utilizing MLD is performed on each one of the number G of subgroups $X_g$ after the QR-decomposition. In other words, the steps corresponding to equations 19 to 22 will be repeated for each one of the number of G subgroups. Hereby can, according to an embodiment of the method, soft information $\hat{X}_g$ for each one of the number G of subgroups $X_g$, respectively, be determined at the MDL, and this soft information $\hat{X}_g$ is utilized for interference cancellation for a subsequently detected subgroup $X_{g+1}$.

After the fourth MLD step 604, the soft information of the g-the subgroup can be regenerated in a fifth step 605 and used for the interference cancellation when detecting the subsequent subgroup g+1. The soft information is also updated in a sixth step 606 of the SGP unit.

Figure 7:
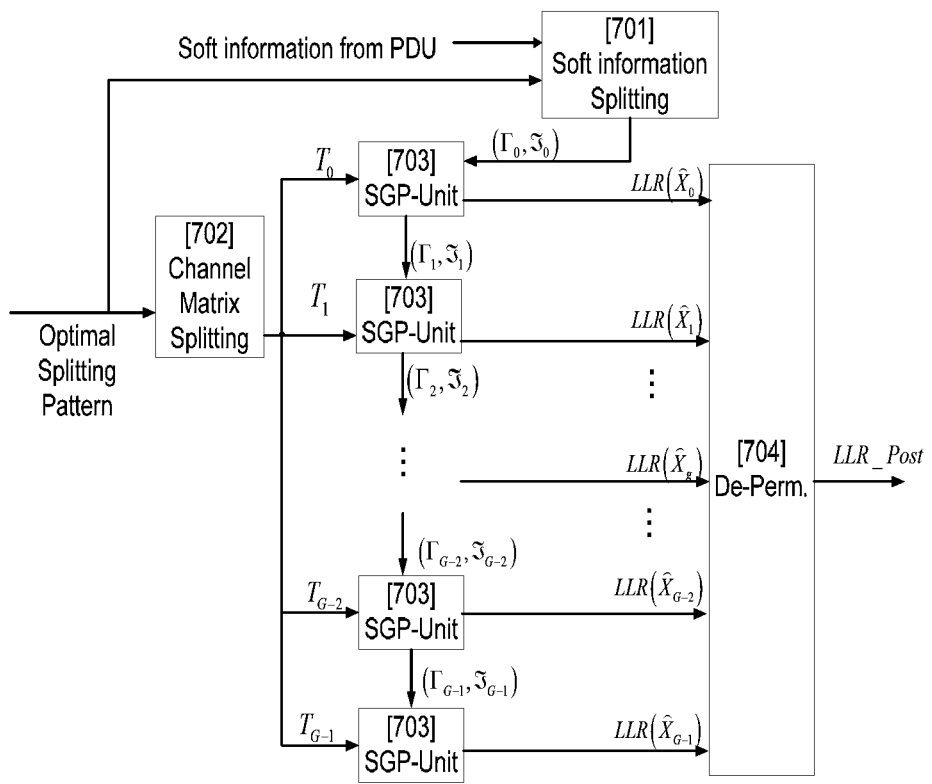
FIG. 7 is a block diagram illustrating a method/configuration of a UE according to an embodiment.

FIG. 7 schematically shows a block diagram of a Subgroup Detection Unit (SDU), including a number G of Subgroup Process units (SGPs) 703 as the one shown in FIG. 6. The SDU receives an optimal splitting pattern from the Optimal splitting unit (OSU) 123, which is provided to a first block 701 for splitting the soft information and to a second block 702 for splitting the channel matrix. Further, the split channel matrix is provided to each one of the number G of SGP units 703.

Also, the split soft information is provided to the SGP units 703. For the first subgroup, i.e. for g=0, the split soft information is used directly. For the other SGP units 703, i.e. for g>1, updated soft information being regenerated for previous subgroups is provided to the SGP units.

LLR values and regenerated soft information are calculated by each SGP unit 703. The updated soft information values are provided to subsequent SGP units. The LLR values are provided to a fourth de-permutation block 704. The de-permutation 704 is an inverse of the permutation $P_0$, being utilized for when the transmitted signal $\hat{S}$ is split into a number G of subgroups $X_g$ in the splitting step 203. The de-permutation block 704 outputs a detection Likelihood Ratio information LLR_Post for the G subgroups.

According to an embodiment of the method, a Log-Likelihood Ratio combination is performed based on pre-detection Likelihood Ratio information $LLR\_Pre(X_g)$ being provided by the PDU 121 for each one of the G subgroups $X_g$ and on detection Likelihood Ratio information $LLR\_Post(X_g)$ provided by the SDU 124 for each one of the G subgroups $X_g$.

Thus, the pre-detection Log-Likelihood Ratio information $LLR\_Pre(X_g)$ is determined based on the pre-detection ( ) and the detection Log-Likelihood Ratio information $LLR\_Post(X_g)$ is determined based on the detection utilizing MLD.

Also, the Log-Likelihood Ratio information $LLR\_Post(X_g)$ for the number G of subgroups $X_g$ is applied with the above described de-permutation before Log-Likelihood Ratio combination is performed.

In a low SNR region, MLD is suboptimal to LMMSE, since the Max log-MAP algorithm is utilized in MLD, in order to reduce the complexity, while the log-MAP algorithm is utilized in LMMSE. The Max log-MAP algorithm includes approximations that lower the complexity, but also the performance, in comparison to log-MAP. This means that LLR_Pre may provide a better quality than LLR_Post for such conditions.

On the other hand, LLR_Pre and LLR_Post can also be approximated as independent estimations made by independent detectors. This means that a filtering/combination process can smooth the noise to further refine the estimations, since additional information is derivable from the independent detections.

Thus, a suitable combination of LLR_Pre and LLR_Post is employed by the embodiment which results in better performance and can make the detector more robust over a wide range of channel conditions.

The filtering/combination is implemented as:

$$LLR = \alpha \times LLR\_Pre + (1-\alpha) \times LLR\_Post \quad \text{(eq. 23)}$$

The factor $\alpha$ can be adaptively chosen based on one or more of existing channel conditions for the effective channel matrix $\hat{H}$, a signal to noise ratio (SNR) for the MIMO transmission, a coding rate used for the MIMO transmission, and a modulation type used for the MIMO transmission. As a non-limiting example can be mentioned that a constant $\alpha=0.5$ often results in acceptable performance.

Figure 8:
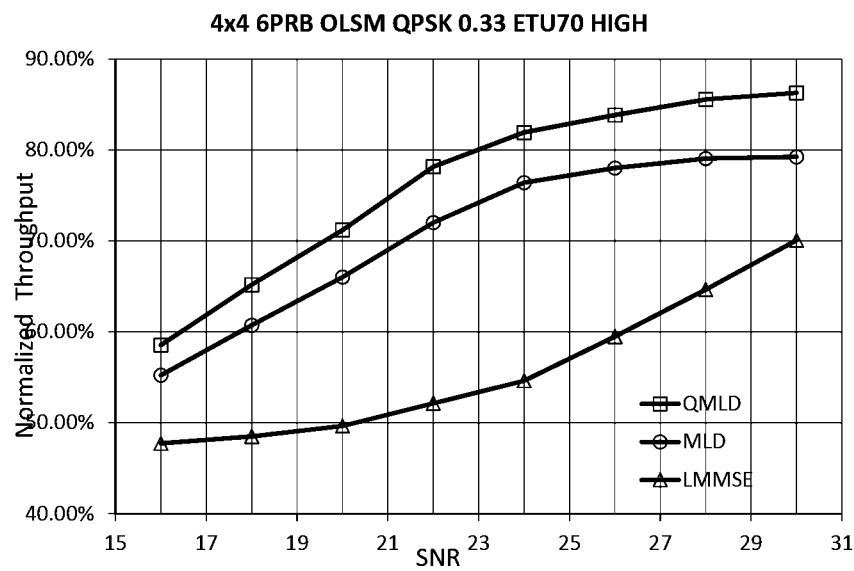
FIG. 8 is a diagram illustrating simulation results.
Figure 9:
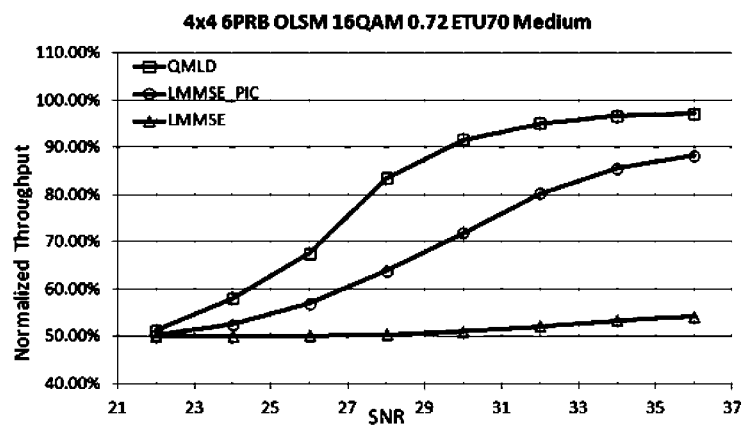
FIG. 9 is a diagram illustrating simulation results.
Figure 10:
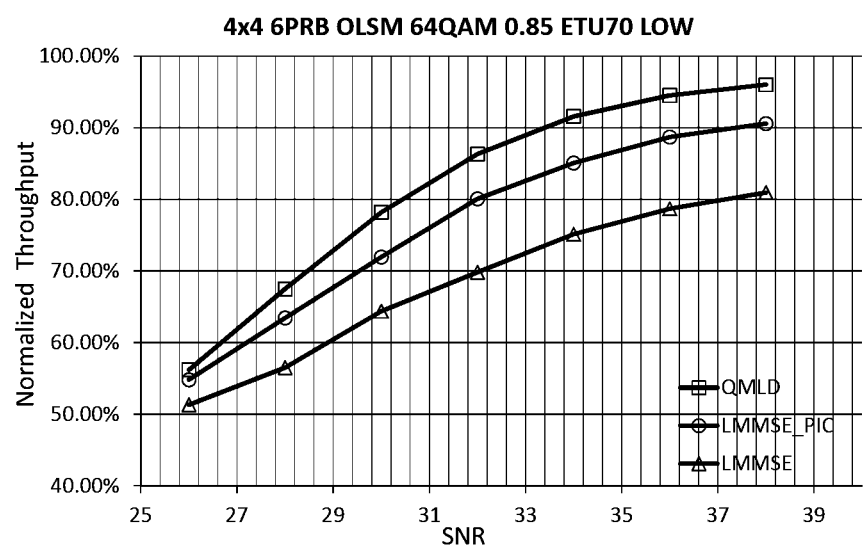
FIG. 10 is a diagram illustrating simulation results.

Table 2 and FIG. 8-10 show simulation evaluations of the performance of the proposed detector, i.e. of the so called QMLD, for the LTE downlink, and a comparison of the QMLD with the above described conventional LMMSE, LMMSE-PIC (excluding ECC), and the conventional MLD. The test parameters are defined in Table 2. The channel models and correlation definitions can be found in 3GPP specification work. In all the tests, L=4 and G=2 have been used. Thus, the number of all possible permutations given by F(8,2) is 35, but the number of reduced permutations in set $\Omega$ for the optimal splitting pattern search is only 8.

TABLE 2

| Parameters | Test1 | Test2 | Test3 |
|---|---|---|---|
| System Bandwidth | 1.4 MHz | 1.4 MHz | 1.4 MHz |
| Transmission mode | TM3 (Open Loop Spatial Multiplexing) | TM3 (Open Loop Spatial Multiplexing) | TM3 (Open Loop Spatial Multiplexing) |
| Channel | ETU-70 | ETU-70 | ETU-70 |
| HARQ | 8 HARQ process, max 4 transmissions | | |
| Feedback delay | 8 milliseconds | | |
| Coding Rate | 0.33 | 0.72 | 0.85 |
| MIMO configuration | 4 × 4 | | |
| Channel Correlation | High | alpha = beta = 0.1 | Low |
| Modulation scheme: | QPSK | 16QAM | 64QAM |
| Channel State Information | Practical CSI Estimation | | |

As can be seen in FIGS. 8, 9 and 10, the proposed QMLD method has the best performance compared to the prior art detectors in all three different test cases. In test case 1, the proposed QMLD outperforms LMMSE and MLD as can be seen in FIG. 8. In test case 2 and 3, the QMLD outperforms LMMSE and LMMSE-PIC, as can be seen in FIGS. 9 and 10, respectively. Thus, the proposed QMLD offers very good performance at low complexity.

The terminology used in the detailed description of the embodiments as illustrated in the accompanying drawings is not intended to be limiting of the described method 200 and or UE 120, which instead are limited by the enclosed claims.

As used herein, the term "and or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and or "comprising", specifies the presence of stated features, actions, integers, steps, operations, elements, and or components, but do not preclude the presence or addition of one or more other features, actions, integers, steps, operations, elements, components, and or groups thereof.

What is claimed is:

1. A Quasi Maximum Likelihood Detection (QMLD) method for processing wireless Multiple Input Multiple Output (MIMO) transmissions from a radio network node in a wireless communication system, comprising:

receiving, by a user equipment, MIMO signals $\hat{Y}$ from said radio network node;

pre-detecting said received signals $\hat{Y}$ to provide an initial estimation of transmitted signals $\hat{S}$ corresponding to the received signals $\hat{Y}$;

splitting the transmitted signals $\hat{S}$ into a number G of disjoint subgroups $X_g$ of transmitted signals, wherein each one of said number G of subgroups $X_g$ of said transmitted signals covers a subgroup $n_g$ of all layers 2L used for said transmitted signals $\hat{S}$; wherein $0 \leq g < G$ and $1 \leq G \leq L$, and wherein said number G of subgroups $X_g$ of said transmitted signals together cover all said layers 2L;

performing interference cancellation on said number G of subgroups $X_g$ of said transmitted signals based on said initial estimation of said transmitted signals $\hat{S}$; and detecting said number G of subgroups $X_g$ of said transmitted signals by utilization of a Maximum Likelihood Detection (MLD) algorithm, wherein said subgroup $n_g$ of all layers within each one of said number G of subgroups $X_g$ of said transmitted signals are detected simultaneously.

2. The method of claim 1, wherein said splitting of the transmitted signal $\hat{S}$ into said number G of subgroups $X_g$ of said transmitted signals includes:

choosing a splitting pattern based on an evaluation of Achievable Information data Rates $AIR_g$ for each one of a number G of subgroups $T_g$ of an effective channel matrix $\hat{H}$ being split according to said splitting pattern.

3. The method of claim 2, wherein said evaluation includes:

identifying a permutation $\hat{P}$ corresponding to a maximum for a sum of said Achievable Information data Rates $AIR_g$; and sorting said identified permutation $\hat{P}$ such that elements $\{C_0, C_1, \ldots C_{G-1}\}$ corresponding to said permutation $\hat{P}$ are arranged in ascending value order $\{C'_0, C'_1, \ldots, C'_{G-1}\}$ such that $C'_m < C'_n$ when $0 \le m < n < G$.

4. The method of claim 3, wherein a set $\Omega$ of all preferable permutations is constructed as including permutations $\hat{P}$ corresponding to a splitting which fulfills all of the following conditions:

if a real part of a first element of an original complex transmitted signal s(i) is in a same subgroup $X_g$ as a real part of a second element of an original complex transmitted signal s(j); (i≠j, 0≤i, j<L), then an imaginary part of said first element of said original complex transmitted signal s(i) shall be in a same subgroup $X_g$ as an imaginary part of said second element of said original complex transmitted signal s(j), and vice visa;

if a real part of a first element of an original complex transmitted signal s(i) is in a same subgroup $X_g$ as an imaginary part of a second element of an original complex transmitted signal s(j); (i≠j, 0≤i, j<L), then an imaginary part of said first element of said original complex transmitted signal s(i) shall be in a same subgroup $X_g$ as a real part of said second element of said original complex transmitted signal s(j), and vice visa; and a real part and an imaginary part of an element of an original complex transmitted signal s(i), (0≤i<L), shall be in different subgroups.

5. The method of claim 4, wherein all preferable permutations of said set $\Omega$ are pre-calculated and stored in a memory.

6. The method of claim 2, wherein a Log-Likelihood Ratio combination is performed based on pre-detection Log-Likelihood Ratio information $LLR\_Pre(X_g)$ for each one of said number G of subgroups $X_g$ and on detection Log-Likelihood Ratio information $LLR\_Post(X_g)$ for each one of said number G of subgroups $X_g$.

7. The method of claim 6, wherein said pre-detection Log-Likelihood Ratio information $LLR\_Pre(X_g)$ is determined based on said pre-detection.

8. The method of claim 6, wherein said detection Log-Likelihood Ratio information $LLR\_Post(X_g)$ is determined based on said detection utilizing MLD.

9. The method of claim 8, wherein said detection Log-Likelihood Ratio information $LLR\_Post(X_g)$ for said number G of subgroups $X_g$ is applied with a de-permutation before said Log-Likelihood Ratio combination is performed, said de-permutation being an inverse of a permutation $P_0$ being utilized for said splitting of said transmitted signals $\hat{S}$ into said number G of subgroups $X_g$.

10. The method of claim 6, wherein said Log-Likelihood Ratio combination is adaptively adjustable based on parameters related to at least one in the group of:

existing channel conditions for said effective channel matrix $\hat{H}$;

signal to noise ratio (SNR) for said MIMO transmissions;

a coding rate used for said MIMO transmissions; and a modulation type used for said MIMO transmissions.

11. The method of claim 1, wherein said interference cancellation includes utilizing soft information $\tilde{X}_g$ corresponding to each one of said subgroups $X_g$, respectively, said soft information $\tilde{X}_g$ being determined at said initial estimation of said transmitted signals $\hat{S}$.

12. The method of claim 1, wherein said interference cancellation includes:

removing, for each subgroup $X_g$, interference from other subgroups;

determining a whitening matrix $W_g$ related to said each subgroup $X_g$;

multiplying an effective channel matrix $T_g$ corresponding to each subgroup $X_g$ with said whitening matrix $W_g$; and performing a QR-decomposition of said multiplied effective channel matrix $T_g$ and said whitening matrix $W_g$, respectively.

13. The method of claim 12, wherein said detection of said transmitted signals utilizing the MLD algorithm is performed on each one of said number G of subgroups $X_g$ after said QR-decomposition.

14. The method of claim 13, wherein soft information $\tilde{X}_g$ for each one of said number G of subgroups $X_g$ is determined at said detection and is utilized for interference cancellation for a subsequently detected subgroup $X_{g+1}$.

15. A non-transitory computer readable medium storing computer-executable instructions that, when executed by a processor, provide for processing wireless Multiple Input Multiple Output (MIMO) transmissions from a radio network node in a wireless communication system according to Quasi Maximum Likelihood Detection (QMLD), the computer executable instructions comprising instructions for:

receiving MIMO signals Y from said radio network node;

pre-detecting said received signals $\hat{Y}$ to provide an initial estimation of transmitted signals $\hat{S}$ corresponding to the received signals $\hat{Y}$;

splitting the transmitted signals $\hat{S}$ into a number G of disjoint subgroups $X_g$ of transmitted signals, wherein each one of said number G of subgroups $X_g$ of said transmitted signals covers a subgroup $n_g$ of all layers 2L used for said transmitted signals $\hat{S}$; wherein $0 \le g < G$ and $1 \le G \le L$, and wherein said number G of subgroups $X_g$ of said transmitted signals together cover all said layers 2L;

performing interference cancellation on said number G of subgroups $X_g$ of said transmitted signals based on said initial estimation of said transmitted signals $\hat{S}$; and detecting said number G of subgroups $X_g$ of said transmitted signals by utilization of a Maximum Likelihood Detection (MLD) algorithm, wherein said subgroup $n_g$ of layers within each one of said number G of subgroups $X_g$ of said transmitted signals are detected simultaneously.

16. An apparatus, comprising:

a memory that stores computer-executable instructions for processing wireless Multiple Input Multiple Output (MIMO) transmissions from a radio network node in a wireless communication system according to Quasi Maximum Likelihood Detection (QMLD); and a processor configured to execute the computer-executable instructions stored in the memory such that, when the computer-executable instructions are executed by the processor, the following steps are performed:

receiving MIMO signals $\hat{Y}$ from said radio network node;

pre-detecting said received signals $\hat{Y}$ to provide an initial estimation of transmitted signals $\hat{S}$ corresponding to the received signals $\hat{Y}$;

splitting the transmitted signals $\hat{S}$ into a number G of disjoint subgroups $X_g$ of transmitted signals, wherein each one of said number G of subgroups $X_g$ of said transmitted signals covers a subgroup $n_g$ of all layers 2L used for said transmitted signals $\hat{S}$; wherein $0 \leq g < G$ and $1 \leq G \leq L$, and wherein said number G of subgroups $X_g$ of said transmitted signals together cover all said layers 2L;

performing interference cancellation on said number G of subgroups $X_g$ of said transmitted signals based on said initial estimation of said transmitted signals $\hat{S}$; and detecting said number G of subgroups $X_g$ of said transmitted signals by utilization of a Maximum Likelihood Detection (MLD) algorithm, wherein said subgroup of layers within each one of said number G of subgroups $X_g$ of said transmitted signals are detected simultaneously.

17. A user equipment arranged for processing wireless Multiple Input Multiple Output (MIMO) transmissions from a radio network node in a wireless communication system according to Quasi Maximum Likelihood Detection (QMLD), comprising:

a receiver unit, configured to receive MIMO signals $\hat{Y}$ from said radio network node; and a processor, configured to:

pre-detect said received signals $\hat{Y}$ to provide an initial estimation of transmitted signals $\hat{S}$ corresponding to the received signals $\hat{Y}$;

split the transmitted signals S into a number G of disjoint subgroups $X_g$ of transmitted signals, wherein each one of said number G of subgroups $X_g$ of said transmitted signals covers a subgroup $n_g$ of all layers 2L used for said transmitted signals $\hat{S}$; wherein $0 \leq g < G$ and $1 \leq G \leq L$, and wherein said number G of subgroups $X_g$ of said transmitted signals together cover all said layers 2L;

perform interference cancellation on said number G of subgroups $X_g$ of said transmitted signals based on said initial estimation of said transmitted signals $\hat{S}$; and detect said number G of subgroups $X_g$ of said transmitted signals by utilization of a Maximum Likelihood Detection (MLD) algorithm, wherein said subgroup $n_g$ of layers within each one of said number G of subgroups $X_g$ of said transmitted signals are detected simultaneously.

* * * * *

UNITED STATES PATENT AND TRADEMARK OFFICE
CERTIFICATE OF CORRECTION

PATENT NO. : 9,118,446 B2  
APPLICATION NO. : 14/031805  
DATED : August 25, 2015  
INVENTOR(S) : Hu et al.

Page 1 of 1

It is certified that error appears in the above-identified patent and that said Letters Patent is hereby corrected as shown below:

In the claims

Column 23, Line 13, "$\hat{S}into$" should read -- $\hat{S}$ into --.

Column 25, Line 26-27, "subgroup of layers" should read -- subgroup $n_g$ of layers --.

Signed and Sealed this  
Seventh Day of June, 2016

Michelle K. Lee  
*Director of the United States Patent and Trademark Office*